April 7, 1953 — G. H. STOCKER — 2,634,399
LANDING APPROACH LIGHTING SYSTEM FOR AIRCRAFT
Filed Nov. 21, 1951 — 2 SHEETS—SHEET 2
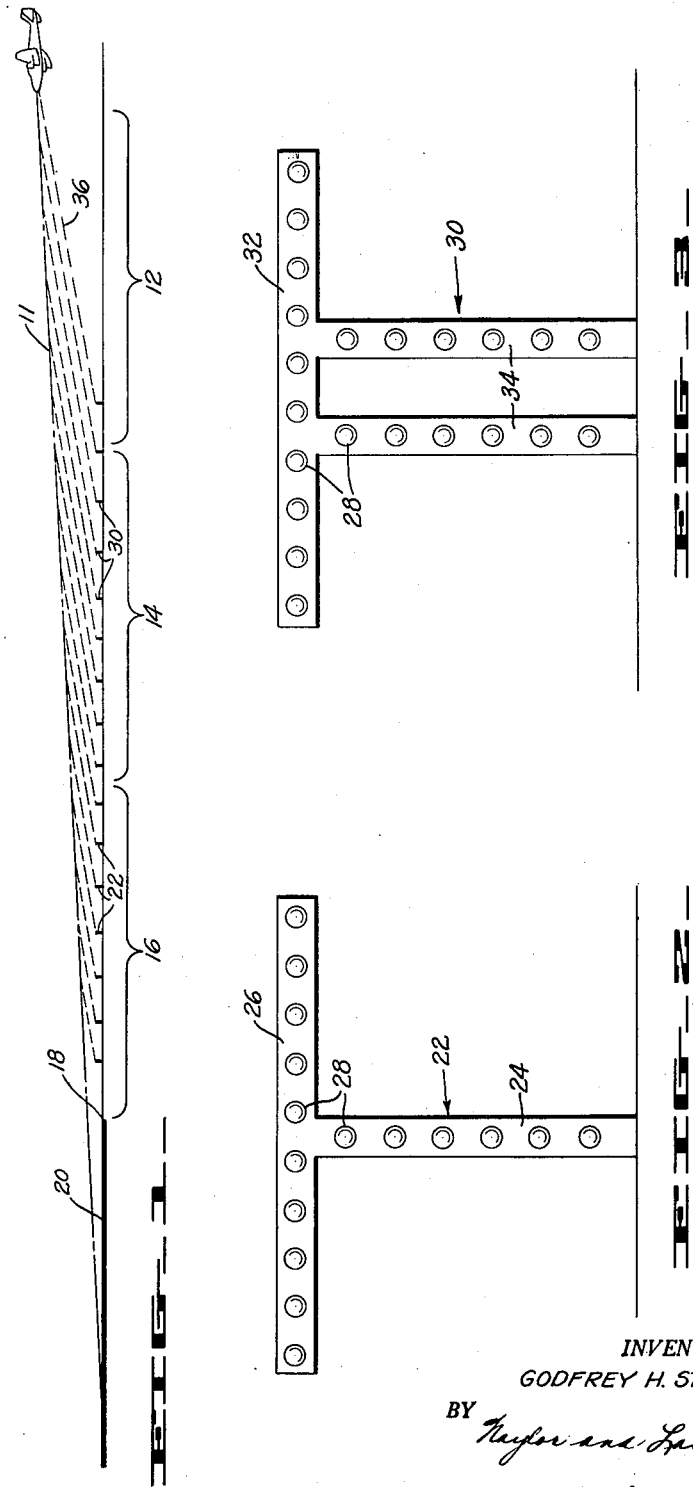
INVENTOR.
GODFREY H. STOCKER
BY
ATTORNEYS Patented Apr. 7, 1953

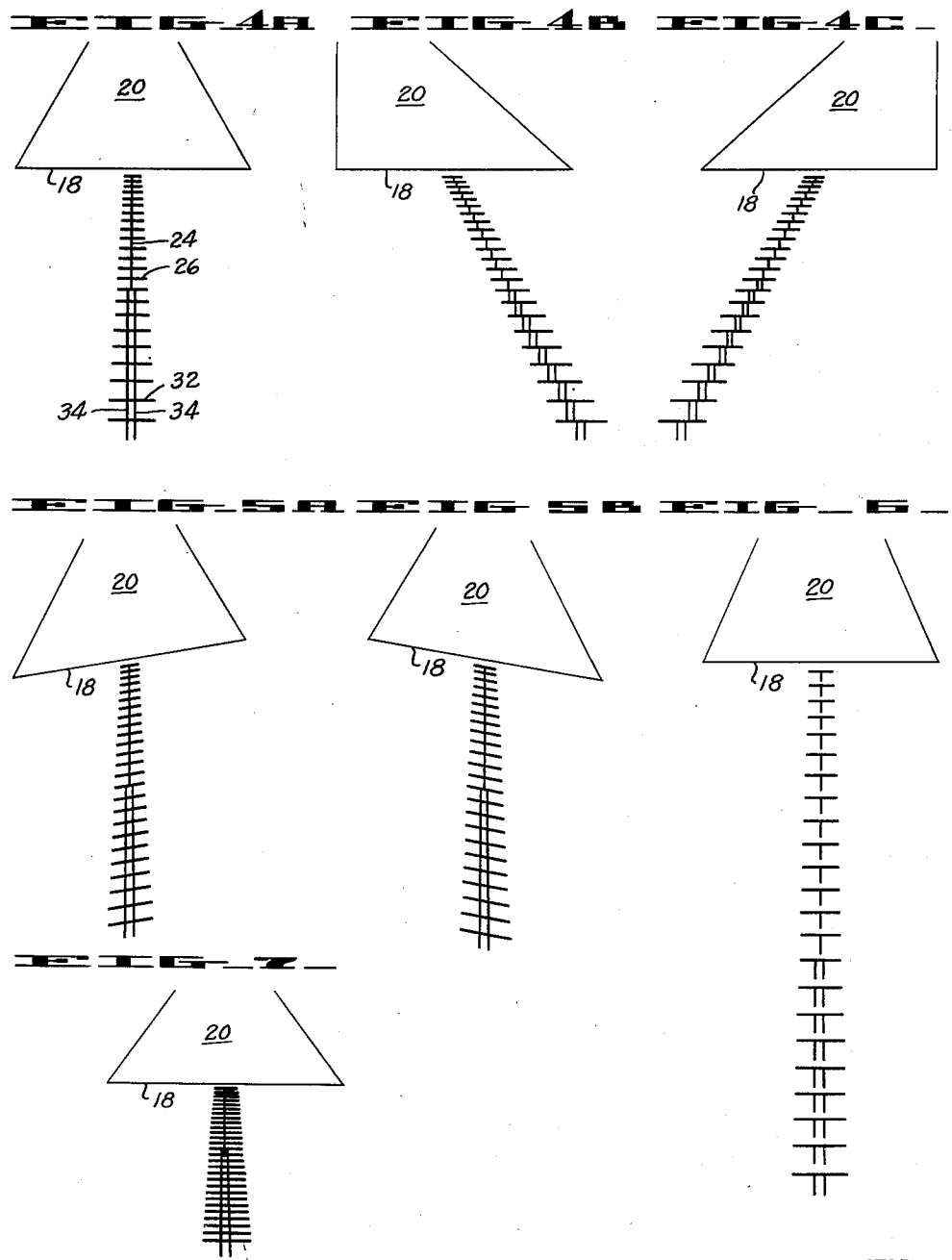

2,634,399

UNITED STATES PATENT OFFICE 2,634,399

LANDING APPROACH LIGHTING SYSTEM FOR AIRCRAFT

Godfrey H. Stocker, Menlo Park, Calif.

Application November 21, 1951, Serial No. 257,470

7 Claims. (Cl. 340—26)

This invention relates to airport approach systems for the guided landing of aircraft, and more particularly to an approach system of the lighted type for the landing guidance of aircraft at night or under cloudy or foggy weather conditions.

An object of the invention is to provide a landing approach lighting system which makes available to aircraft pilots the following five factors of landing guidance: Directional, or runway axis alignment, guidance; lateral displacement, or distance to either side of the extended centerline of the runway, guidance; horizon, or angle of roll, guidance; distance out from the runway threshold guidance; and elevation guidance.

A further object of the invention is to provide a landing approach lighting system which is simple and highly reliable, and thus requires a minimum of interpretation on the part of the aircraft pilot.

Further objects and advantages of the invention will be apparent from the following description taken in conjunction with the drawings forming part of this specification, and in which:

Figure 1 is a semi-schematic view in side elevation of the approach landing system of the invention;

Figure 2 is a view in elevation of one of the forms of guide units utilized in the landing approach system;

Figure 3 is a view in elevation of another form of guide unit utilized in the approach system along with the guide unit of Figure 1;

Figure 4A is a schematic view of the approach system as it would appear to the pilot of an aircraft which is on course and also on the ideal glide path for landing;

Figure 4B is a schematic view of the approach system as it would appear to the pilot of an aircraft which is on the ideal glide slope but located to the left of the centerline of the runway;

Figure 4C is a schematic view showing the approach system as it would appear to the pilot of an aircraft which is located on the ideal glide slope but displaced to the right of the centerline of the runway;

Figure 5A is a schematic view of the system as it would appear to the pilot of an aircraft which is on course and on the ideal glide slope path, but banked to the right;

Figure 5B is a schematic view of the system as it would appear to the pilot of an aircraft which is on course and on the ideal glide slope path, but banked to the left;

Figure 6 is a schematic view of the approach system as it would appear to the pilot of an aircraft which is on course, but too high; and Figure 7 is a schematic view of the approach system as it would appear to the pilot of an aircraft which is on course, but located below the ideal glide slope path.

Referring to the drawings for more specific details of the approach system of the invention, Figure 1 indicates an aircraft 10 following an imaginary glide slope path 11, which, typically, forms an angle of 3 degrees with the runway, over landing approach ground, indicated as consisting of three zones 12, 14 and 16, toward the threshold 18 of runway 20. Located in alignment with the centerline of the runway and at equi-spaced intervals through approach zone 16 are a number of vertically disposed T-shaped guide units indicated generally by 22 and shown in Figure 2. The units 22 consist of vertically disposed stem members 24 and horizontally disposed cross bars 26, with both the stems and the cross bars having a plurality of spaced sealed beam aircraft landing type lamps 28.

Located symmetrically with respect to the centerline of the runway 20 and at equi-spaced intervals through approach zone 14 are a plurality of units indicated generally by 30 and illustrated in Figure 3. The units 30 consist of horizontal cross bar elements 32 which are of the same length as the cross bar elements 26 of units 22, and a pair of vertically disposed stem elements 34 which, the ground surfaces of zones 14 and 16 being at the same level, are equal in length to the stem elements 24 of units 22. The cross bars 32 and stems 34 of guide units 30 are each provided with spaced sealed beam aircraft landing-type lamps 28 which are preferably similar in number, type, spacing and color to the lamps carried by units 22.

The approach zones 12, 14 and 16 are each, for example, 1,000 feet in length. No guide units are located within zone 12, but the pilot of the aircraft begins to see the light beams, indicated at 36, of the outer guide units 30 when his aircraft is on the glide path 11 and approximately at the beginning of approach zone 12. The lamps 28 of units 22 and 30 are directed upwardly at an angle of 10 degrees with respect to the runway level. If the aircraft is on the proper glide slope path, the pilot knows that he is approximately 3,000 feet from the runway threshold 18 when he first begins to see the lighted guide lamps. The pilot's problem then becomes one of properly interpreting the lighted configuration provided him by the units 22 and 30 and guiding the aircraft accordingly in order to touch the craft down on the runway with the axis of the craft in alignment with the axis, or centerline, of the runway. The desired directional factors are provided in the manner hereinafter described.

When the longitudinal axis of the aircraft is in alignment with the centerline of the runway and the aircraft is on the ideal 3 degree glide path, the stems 24 of units 22 will present the appearance of an unbroken lighted line, as indicated in Figure 4A, with the stems 34 of units 30 providing a pair of unbroken lighted lines. If the approach system presents the appearance to the aircraft pilot of Figure 4B, i. e., that of a series of single stem and double stemmed T's, with no spaces appearing between the T's and with no appreciable foreshorting of the stems of the T's, this is an indication to the pilot that his craft is on the ideal glide slope path but located to the left of the runway centerline course, and he then alters his course accordingly. If, on the other hand, the approach system presents the appearance of that shown in Figure 4C, this is a corresponding indication to the pilot that his aircraft is located on approximately the correct glide slope path but to the right of the runway centerline course, and a correction of the course can then be simply made so that the system presents the appearance of the lighted configuration of Figure 4A.

If the aircraft is on course and located on the ideal glide slope path but banked to the right, i. e., with the right wing lower than the left wing, the approach system will present the lighted configuration shown in Figure 5A. Here again, the straight line configurations presented by the stem elements 24 and 34 indicate that the aircraft is on course, and the unbroken continuity of the series of single stem and double stemmed T's merging together with no appreciable foreshorting of the apparent length of the stems indicates that the aircraft is on the ideal glide slope path. If the same conditions obtained as would present to the pilot the approach system appearance in Figure 5A, but the aircraft is banked to the left rather than the right, the configuration of the lighted guide units would be similar to that shown in Figure 5B. In either case, the pilot is provided with a very simple visual indication that the transverse or wing axis of his aircraft is not parallel to the horizon, and the banked condition of the craft can be corrected accordingly.

If the aircraft is on the proper course, but located too high, or above the ideal glide path, the single stem and double stemmed T guide units will present the spaced appearance of that of Figure 6. Upon decreasing the altitude of the aircraft to the point where the T-shaped guide units present an unbroken or continuous appearance, visual indication will then be had that the aircraft is again on the correct glide slope path.

If the aircraft is on the proper course with respect to the runway centerline, but is located too low, or below the ideal glide slope path, the lighted approach system will present the appearance similar to that indicated in Figure 7 wherein the horizontal cross bar elements 26 and 32 appear wider than in Figure 4A, due to closer proximity of the ship to the ground, and the relative spacing between the horizontal cross bars in relation to their width is markedly lesser. Stated otherwise, the single and double stems of the T's appear foreshortened in relation to the width of the guide units, or length of the cross bars. The aircraft course will then be corrected to intercept the ideal glide slope path and follow the same.

The fifth guidance factor, distance out from the runway threshold 18, is provided by the double stemmed elements 34 of guide units 30 residing within approach zone 14. As the pilot passes over the last of the units 30, thus leaving the double stemmed T zone and entering the single stemmed T zone, he will then know that he is about 1,000 feet from the runway threshold.

It is to be pointed out that the approach zone terrain need not be uniformly at the level of the runway, as it has been shown in Figure 1 for purposes of simple illustration of the system. The system may readily be installed in an approach zone where the terrain is quite irregular merely by adjusting the spacing between individual T units so that the units present the appearance in perspective along the glide slope of being equally spaced apart.

From the foregoing, it will be seen that I have provided a very simple and reliable landing approach light system which requires a minimum of interpretation by aircraft pilots. While a preferred embodiment of the approach system has been shown and described, it is to be understood that all substantial equivalents of said embodiments are within the scope of the invention.

What is claimed is:

1. A landing approach lighting system for airports comprising a plurality of spaced and aligned vertically disposed T-shaped units located in the approach area of an airport runway and in alignment with the centerline of the runway, and a plurality of spaced lights carried by both the stem and cross bar elements of said units.

2. An aircraft landing guidance system for the approach area of an airport runway comprising a plurality of spaced guide elements having vertically disposed stems in alignment with the centerline of the runway and horizontally disposed cross bars surmounting said stems and extending transversely of the runway centerline, and a plurality of spaced landing lamps carried by the stems and cross bars of said guide elements and inclined upwardly at an angle of approximately 10 degrees from the horizontal.

3. An aircraft landing guidance system for the approach area of an airport runway comprising a plurality of alike and equi-distantly spaced guide elements having vertically disposed stems in alignment with the centerline of the runway and horizontally disposed cross bars surmounting said stems and extending transversely of the runway centerline, said guide elements being so spaced in relation to their height that the stem portions thereof present the appearance of an unbroken line to an observer in an approaching aircraft having its longitudinal axis in alignment with the runway centerline and located on a glide slope landing attitude path of approximately 3 degrees.

4. An aircraft landing guidance system as set forth in claim 3 wherein a plurality of spaced landing lamps are mounted on the stems and cross bars of said guide elements and inclined upwardly at an angle of approximately 10 degrees from the horizontal.

5. An aircraft landing guidance system for the approach area of an airport runway comprising a plurality of spaced and aligned vertically disposed T-shaped units in alignment with the centerline of the runway.

6. An aircraft landing guidance system for the approach area of an airport comprising a plurality of alike single stem T-shaped units disposed in the inner portion of the approach area and a plurality of alike double stem T-shaped units disposed in the outer portion of the approach area, all of said units being vertically disposed and equi-distantly spaced apart and having equi-sized cross bar elements extending transversely of the centerline of the runway, with the stem elements of said first-mentioned units being in alignment with the centerline of the runway, and with the stem elements of each of said second-mentioned units being symmetrically located with respect to the runway centerline.

7. An aircraft landing guidance system as set forth in claim 6, with the stem and cross bar elements of said units having mounted thereon a plurality of spaced landing lamps inclined upwardly at an angle of approximately 10 degrees from the horizontal.

GODFREY H. STOCKER.

REFERENCES CITED

The following references are of record in the file of this patent:

UNITED STATES PATENTS

| Number | Name | Date |
|---|---|---|
| 2,596,603 | Sands | May 13, 1952 |

FOREIGN PATENTS

| Number | Country | Date |
|---|---|---|
| 450,878 | Great Britain | July 27, 1936 |

OTHER REFERENCES

Popular Science, March 1949 page 161.